United States Patent [19]
Jose et al.

[11] Patent Number: 4,729,012
[45] Date of Patent: Mar. 1, 1988

[54] DUAL MODE TELEVISION RECEIVER FOR DISPLAYING WIDE SCREEN AND STANDARD ASPECT RATIO VIDEO SIGNALS

[75] Inventors: David L. Jose, Mercer County, N.J.; Spyros W. Tsokas, Montgomery County, Pa.; Robert A. Dischert, Burlington County, N.J.

[73] Assignee: RCA Corporation, Princeton, N.J.

[21] Appl. No.: 771,551

[22] Filed: Aug. 30, 1985

[51] Int. Cl.⁴ ................ H04N 11/20; H04N 7/01
[52] U.S. Cl. ..................... 358/11; 358/140; 358/12; 358/180
[58] Field of Search .......... 358/180, 160, 140, 141, 358/11, 12, 21 R; 382/45

[56] References Cited

U.S. PATENT DOCUMENTS

| | | | |
|---|---|---|---|
| 3,935,381 | 1/1976 | Petrocelli et al. | 358/180 |
| 4,085,425 | 4/1978 | Hamill | 358/180 X |
| 4,385,324 | 5/1983 | Shioda et al. | 358/237 |
| 4,449,143 | 5/1984 | Dischert et al. | 358/11 |
| 4,551,754 | 11/1985 | Meise et al. | 358/180 |
| 4,556,906 | 12/1985 | Dischert et al. | 358/180 |
| 4,567,508 | 1/1986 | Hulyer | 358/11 |
| 4,574,300 | 3/1986 | Hulyer | 358/12 X |
| 4,605,950 | 8/1986 | Goldberg et al. | 358/11 |
| 4,605,952 | 8/1986 | Powers | 358/12 X |
| 4,611,225 | 9/1986 | Powers | 358/140 |
| 4,622,577 | 11/1986 | Reitmeier et al. | 358/140 X |
| 4,623,922 | 11/1986 | Wischermann | 358/160 |
| 4,631,574 | 12/1986 | LoCicero et al. | 358/141 X |
| 4,651,208 | 3/1987 | Rhodes et al. | 358/140 |

FOREIGN PATENT DOCUMENTS 2746285  4/1978  Fed. Rep. of Germany ...... 358/180

*Primary Examiner*—Michael A. Masinick
*Assistant Examiner*—E. Anne Toth
*Attorney, Agent, or Firm*—Paul J. Rasmussen; Peter M. Emanuel; Richard G. Coalter

[57] ABSTRACT

A wide aspect ratio television system includes memories for storing and recovering a video input signal in response to read and write clock pulses, respectively. Write clock pulses are deleted to compress edge regions of a wide aspect ratio input signal and read clock pulses are deleted to restore the signal to its original aspect ratio. The pattern of deleted pulses is altered on a line-by-line basis to reduce visible artifacts of signal decimation. Dual mode receivers include provisions for controlling edge blanking, interpolation and the pattern of clock pulses deleted as a function of received signals. Wide and standard aspect ratio images are displayed without altering the width of the display raster.

8 Claims, 14 Drawing Figures

Fig. 3

A — WIDE SCREEN CAMERA VIDEO (S1) — 1-H = 63.5μS

| BLANKING | ACTIVE VIDEO 52.6μS | | |
|---|---|---|---|
| 10.9μS | LEFT 10.5μS | CENTER 31.6μSEC | RIGHT 10.5μS |

B — 1100 FH WRITE CLOCK

| BLANKING | LEFT | | | CENTER | RIGHT | | |
|---|---|---|---|---|---|---|---|
| 190 | 52 | 52 | 52 | 598 | 52 | 52 | 52 |

C — PIXELS DELETED

| −34 | 39 | 26 | 13 | ZERO | 13 | 26 | 39 |

D — COMPRESS MEMORY CONTENTS

| BLANKING | LEFT | | | CENTER | RIGHT | | |
|---|---|---|---|---|---|---|---|
| 156 | 13 | 26 | 39 | 598 | 39 | 26 | 13 |

E — 910 FH READ CLOCK (VIDEO OUT) S2

| BLANKING 156 | 754 PIXELS | | |
|---|---|---|---|
| 10.9μS | 5.25μS | 41.2μS | 5.25μS |

1-H = 63.5μSEC

| INTERVAL | SYNC | COMPRESS/EXPAND | | | CENTER | COMPRESS/EXPAND | | |
|---|---|---|---|---|---|---|---|---|
| PIXELS | 190 | 52 | 52 | 52 | 598 | 52 | 52 | 52 |
| DATA | 1110 | 1000 | 1010 | 1101 | 1 | 1011 | 0101 | 0001 |
| ADDRESS | 0–47<br>48–183<br>184–189 | 190–241 | 242–293 | 294–345 | 346–943 | 944–995 | 996–1047 | 1048–1099 |

*Fig. 5*

| INTERVAL | SYNC | COMPRESS/EXPAND | | | CENTER | COMPRESS/EXPAND | | |
|---|---|---|---|---|---|---|---|---|
| PIXELS | 190 | 52 | 52 | 52 | 598 | 52 | 52 | 52 |
| DATA | 1110 | 0010 | 0101 | 0111 | 1 | 1110 | 1010 | 0100 |
| ADDRESS | 2048–2095<br>2096–2231<br>2232–2237 | 2238–2289 | 2290–2341 | 2342–2393 | 2394–2991 | 2992–3043 | 3044–3095 | 3096–3147 |

A — COMPATABLE VIDEO IN

| | 1-H = 63.5μS | | |
|---|---|---|---|
| SYNC | ACTIVE VIDEO 52.6μS | | |
| 10.9μS | LEFT 5.25μS | CENTER 41.2μS | RIGHT 5.25μS |

B — 910 FH WRITE CLOCK

| SYNC | 754 PIXELS | | |
|---|---|---|---|
| 156 | LEFT 78 | CENTER 598 | RIGHT 78 |

C — EXPAND MEMORY CONTENTS

| 156 | 13 | 26 | 39 | 598 | 13 | 26 | 39 |

D — PIXELS REPEATED (CLOCK INHIBIT)

| 34 | 39 | 26 | 13 | ZERO | 13 | 26 | 39 |

E — 1100 FH READ CLOCK 5:3 (VIDEO OUT)

| SYNC | LEFT | CENTER | RIGHT |
|---|---|---|---|
| 190 | 52 \| 52 \| 52 | 598 | 52 \| 52 \| 52 |
| 10.9μS | 10.5μS | 31.6μS | 10.5μS |

| INTERVAL | SYNC | PAUSE | 4:3 VIDEO | PAUSE |
|---|---|---|---|---|
| PIXELS | 190 | 78 | 754 | 78 |
| DATA D2 | 1110 | 0 | 1 | 0 |
| ADDRESS (PAGE TWO SAME) | 0–47, 48–189 (1, 183, 184, 189) | 190–267 | 268–1021 | 1022–1099 |

*Fig. 12*

| INTERVAL | SYNC | FILL OR INTERP. | VIDEO | FILL OR INTERP. |
|---|---|---|---|---|
| PIXELS | 190 | 96 | 718 | 96 |
| DATA D3 | 0 | 1 | 0 | 1 |
| ADDRESS (PAGE TWO SAME) | 0–189 | 190–285 | 286–1003 | 1004–1099 |

*Fig. 13*

DUAL MODE TELEVISION RECEIVER FOR DISPLAYING WIDE SCREEN AND STANDARD ASPECT RATIO VIDEO SIGNALS

FIELD OF THE INVENTION

This invention relates to wide screen television systems of the type in which compatibility with conventional television receivers is achieved by compressing or "squeezing" the edges of a wide screen imager and particularly to receivers for displaying both wide screen and standard aspect ratio imagers.

BACKGROUND OF THE INVENTION

It has been recognized by Meise et al. in their allowed U.S. patent application Ser. No. 350,088 filed Feb. 18, 1982, (now U.S. Pat. No. 4,551,754) that a wide screen television signal may be made compatible with conventional television receivers by compressing or "squeezing" the left and right edges of the wide screen image. When displayed on a conventional television receiver, the squeezed edges of the image are largely hidden from view due to receiver overscan. When displayed on a wide screen receiver, the compressed edges are restored to their original width by means of time expansion circuits. In one embodiment of the Dischert et al. system, picture edge squeezing is provided by modifying the horizontal drive signal to a camera. In another embodiment, image restoration ("de-squeezing") is provided by means of a memory which stores the video signal in response to a constant frequency write clock and recovers the stored signal in response to a variable frequency read clock. Changing the read clock frequency alters the relative timing of picture elements within a horizontal line thereby facilitating expansion of the compressed edges of the displayed image.

To provide for display of both wide screen and standard aspect ratio (i.e., 4:3) images in a dual mode receiver, Dischert et al. propose that a coded signal be added to the vertical blanking interval of the compatible (edge squeezed) wide screen signal for identifying the signal as being representative of a wide screen image. (As used herein, the term wide screen means any aspect ratio greater than 4:3 as used in conventional television displays.) The coded signal is detected in the dual mode receiver and used to control the display raster width and the edge expansion circuit. When the code is present, the edge expander circuits are enabled and the raster width is expanded to the full width of a wide screen kinescope. When standard television signals are received, the absence of the code is detected and used to reduce the raster width to provide a 4:3 aspect ratio and the edge expansion circuits are disabled (by-passed).

Similar edge expansion and raster width control arrangements are described in a further allowed U.S. patent application of Dischert et al. entitled KINESCOPE BLANKING SCHEME FOR WIDE-ASPECT RATIO TELEVISION, Ser. No. 551,918 filed Nov. 15, 1983 (now U.S. Pat. No. 4,556,906). The technique of varying the raster width in a receiver for displaying wide and standard aspect ratio images is further exemplified in a projection television system proposed by Shioda et al. in U.S. Pat. No. 4,385,324 entitled WIDE SCREEN PROJECTION APPARATUS which issued May 24, 1983. In the Shioda et al. system a coded signal is also employed for automatically controlling the raster size in a dual mode receiver.

Another example of a compatible wide-screen system is described by K. H. Powers in U.S. patent application Ser. No. 504,374 filed June 14, 1983 as a continuation-in-part of application Ser. No. 485,446 filed Apr. 14, 1983 (now U.S. Pat No. 4,605,952). In the Powers system the center portion of the image is slightly compressed (by about 2.5%) and the compression of the edges of the image ramps linearly to a factor of about 3:1 at the extreme edges. Edge compression is provided in the Powers system by the use of variable clock rate sampling of an analog video signal. The sampling rate is varied by applying the output of a very high frequency (4.374 Giga-Hertz) oscillator to a programmable divider having divisor coefficients stored in a programmable read only memory (ROM). The ROM is addressed by a counter that is clocked during each line interval thereby changing the divisor coefficients and thus changing the sampling frequency to control the edge compression of the sampled video signal.

SUMMARY OF THE INVENTION

It is recognized herein that dual mode television receivers of the type which alter the horizontal sweep width of a wide screen display for displaying both wide and standard aspect ratio images are relatively complex and may be subject to convergence problems. Specifically, a display device, such as a direct view kinescope or a projection system, which is properly converged for displaying a wide angle image may require re-converging for displaying standard aspect ratio (i.e., 4:3) images. The present invention is directed in a first respect to providing a solution to this problem.

A video display system embodying the invention includes a display means for producing a raster of constant width and an aspect ratio greater than 4:3. A source provides a video input signal representation of an image having an aspect ratio equal to 4:3. Processing means, coupled to the source and responsive to the video input signal, supplies a processed video output signal to the display means in which each horizontal line thereof includes a horizontal synchronizing interval, a delay interval and an active video interval for causing said raster of said display means to produce an image having a 4:3 aspect ratio and a horizontal position determined by the delay provided by said processing means.

BRIEF DESCRIPTION OF THE DRAWING

The invention is illustrated in the accompanying drawing wherein like elements are devoted by like designators and in which:

FIGS. 2 and 3 are diagrams illustrating operation of the system of FIG. 1;

FIGS. 5 and 6 are tables listing the contents of a ROM used in the system of FIG. 1;

FIG. 9 is a diagram illustrating operation of the receiver of FIG. 8;

FIGS. 12 and 13 are tables listing ROM memory contents of the expander of FIG. 11.

DETAILED DESCRIPTION

Figure 1:
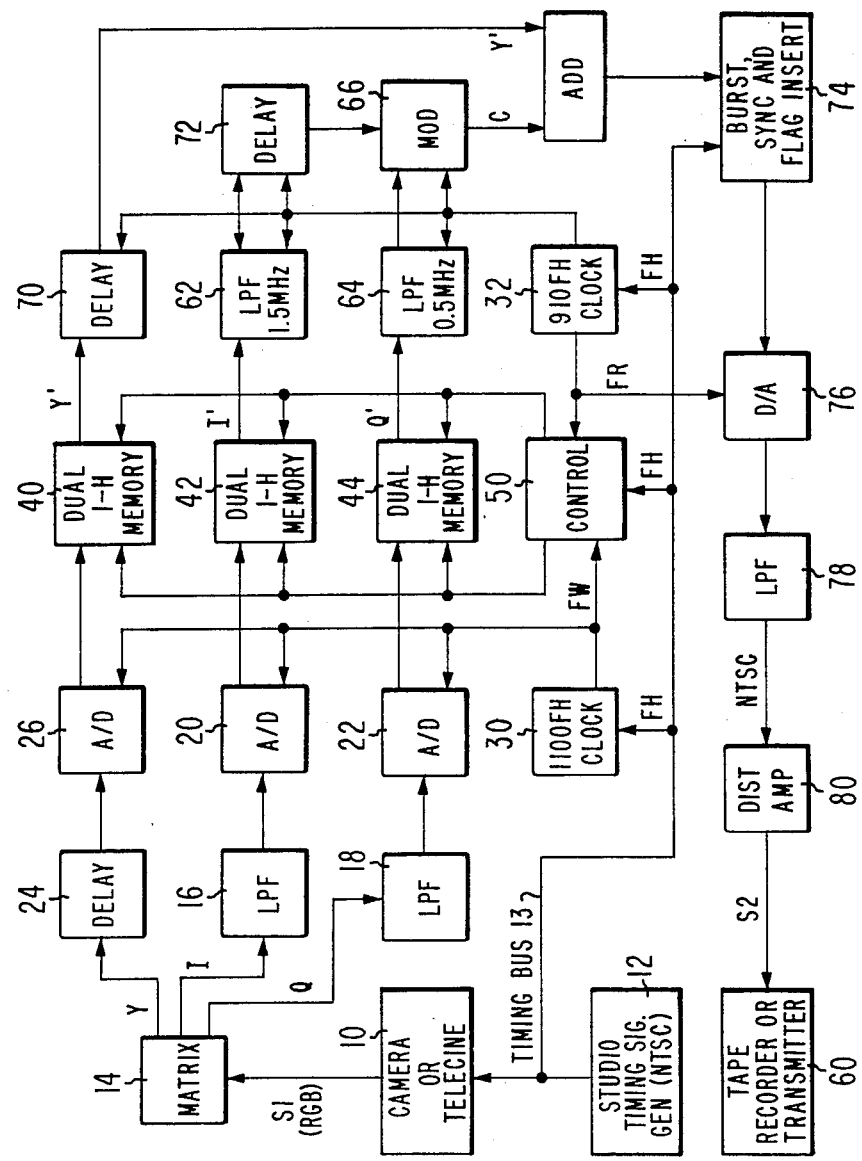
FIG. 1 is a block diagram of a compatible wide screen video signal generating system embodying aspects of the invention.

The compatible wide screen video signal generating system of FIG. 1 comprises a camera (or telecine machine) 10 coupled to a studio timing signal generator 12 which provides standard NTSC timing signals for controlling the line and field rates of the camera. When producing wide screen compatible signals for PAL or SECAM receivers an appropriate timing signal generator should be used. Camera 10 is of conventional design but is adjusted to provide a video output signal S1 in RGB form having a wide aspect ratio (e.g., about 5:3). The adjustment may be done by reducing the amplitude of the vertical sweep signal supplied to the camera imager or, if sufficient target area is available, by increasing the amplitude of the horizontal sweep signal. Similar adjustments may be made to a conventional telecine machine to provide the wide screen video signal S1.

The wide screen video signal S1 is converted to Y, I and Q components by means of a matrix 14. The I and Q components are low pass filtered by anti-aliasing low-pass filters 16 and 18, respectively, and converted to digital form by analog-to-digital (A/D) converters 20 and 22, respectively. The luma signal Y is delayed in unit 24 (to compensate for the delay imparted to the I and Q signals due to low pass filtering) and converted to digital form in converter 26.

Converters 20, 22 and 26 are all clocked by a clock signal FW at a frequency equal to 1100 times the horizontal line frequency of the video signal S1. The clock signal, FW, is provided by a write clock generator 30 coupled via a timing bus 13 to the studio timing signal generator 12 for receiving a horizontal line rate timing signal FH. Preferably, generator 30 is implemented as a phase lock loop to ensure that there are an integer number (1100 in this example of the invention) of clock pulses in each line of the video signal S1. Alternatively, other frequency multiplication techniques may be used to generate the write clock signal FW.

Figure 4:
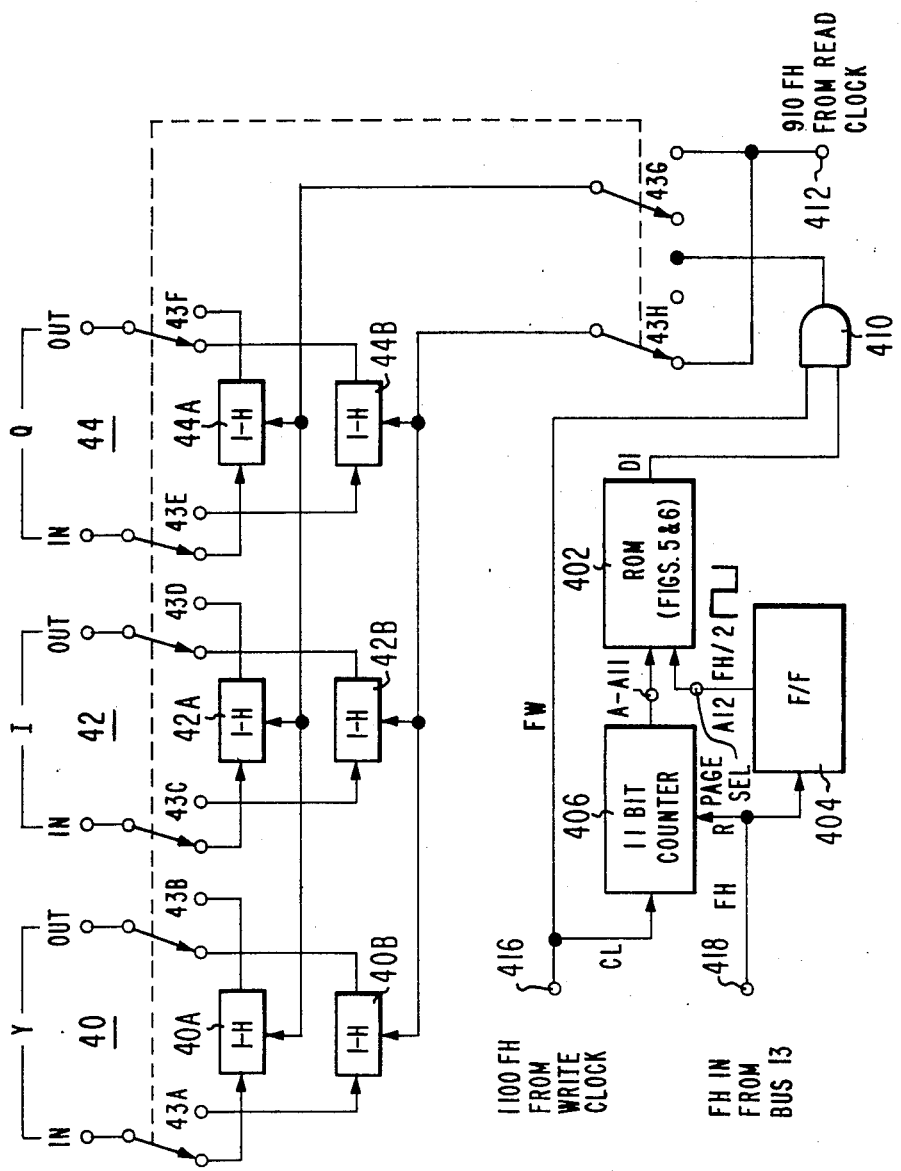
FIG. 4 is a block diagram illustrating details of compression elements of the system of FIG. 1.

The digitized Y, I and Q video signals are applied to respective ones of dual one-line (1-H) memories 40, 42 and 44. Read and write operations of the memories are controlled by a control unit 50 having inputs for receiving the write clock signal FW from clock 30, the line rate (horizontal sync) signal FH from timing bus 13 and a read clock signal FR from a read clock generator 32. The frequency of the read clock signal is 910 times the line frequency FH. Clock 32, preferably, is also phase locked to signal FH thereby ensuring that the difference between the number read clock pulses (910) and the number of write clock pulses (1100) per line of video signal S1 is constant. Memories 40-44 and control unit 50 may be implemented as shown in FIG. 4 discussed subsequently.

Memories 40-44, in combination with clocks 30 and 32 and control unit 50, provide the function of squeezing the edges of the wide screen video signal as will be described in detail subsequently. After edge compression, the component signals (Y', I' and Q') are converted to composite form for application to a tape recorder or transmitter 60. Specifically, the I' and Q' signals are low pass filtered to bandwidths of 1.5 and 0.5 MHz, respectively, by means of filters 62 and 64, respectively, and applied to a modulator 66 which quadrature amplitude modulates the signals on a standard color subcarrier to provide a chroma signal C. Delay units 70 and 72 add delay to signals Y' and I' to match the delay imparted to signal Q' by filter 64 to ensure proper registration of the component signals. Chroma signal C and luma signal Y' are combined in an adder 74 and the resultant signal is applied to unit 74 which inserts standard NTSC burst and blanking signals as well as a "flag" signal (in the vertical blanking interval) for identifying the processed signal as being a compatible wide screen signal. As previously mentioned, this flag signal (inserted in the video signal) is ultimately used in a dual mode receiver for automatically selecting wide and standard aspect ratio operation.

After sync, blanking and flag insertion, the digital signal is converted to analog form in digital-to-analog converter 76, low pass filtered in unit 78 to limit the bandwidth to 4.2 MHz (the standard NTSC broadcast value) and applied to recorder or transmitter 60 via a distribution amplifier 80.

Figure 2:
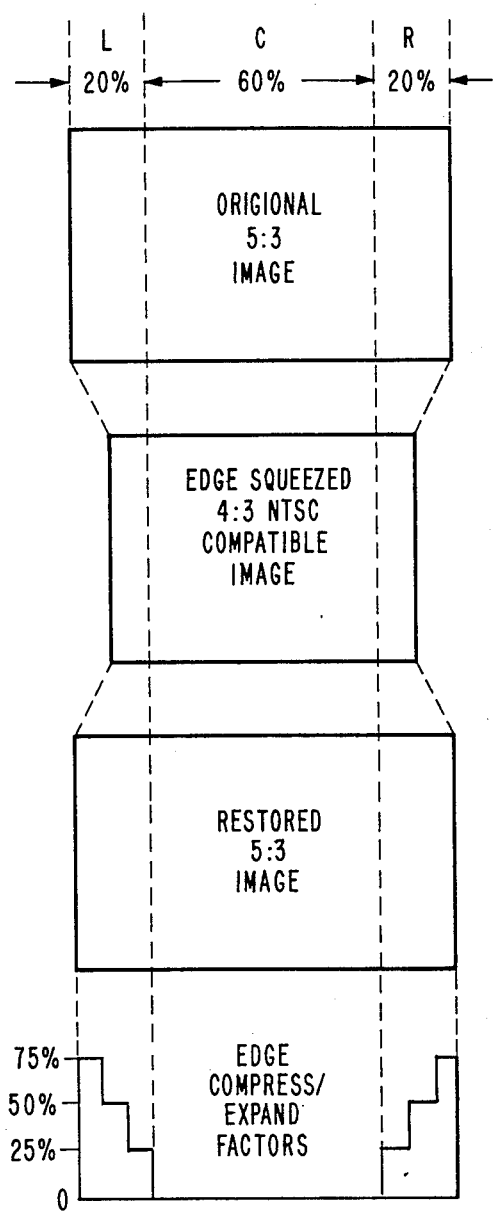

The processed signal S2 conforms to NTSC broadcast standards in all respects except for the compression of left and right edge regions of the picture. The image compression, as shown in FIG. 2, is provided in steps of 25, 50 and 75 percent for each of the left (L) and right (R) edges of the original 5:3 aspect ratio wide screen image. Each edge region corresponds to about 20 percent of the image before compression and to about 10 percent of the image after compression. Accordingly, when the compatible (squeezed) signal is displayed on a standard television receiver (having about 5 percent overscan on each edge) about half of the squeezed portion of the image is hidden from view by the overscan. (The hidden half contains the greatest compression. The visible half contains the least compression and has been found to be unnoticeable). In a wide screen receiver complementary expansion circuits restore the edge regions to their original widths.

In operation, the wide screen video signal S1 provided by camera 10 has NTSC standard line and field rates. As shown in FIG. 3A, the period of one line is about 63.5 microseconds (10.9 microseconds of blanking and 52.6 microseconds of "active" video). The active video portion of signal S1 is illustrated as comprising 10.5 microseconds for each edge and 31.6 microseconds for the center portion of the image. This corresponds approximately to the factors of 20%, 60% and 20% for the left, center and right portions of the wide screen image illustrated in FIG. 2. By compression, each edge region is reduced to occupy about 1% (5.25 microseconds, FIG. 3E) of the active video interval by deletion of a number, 190, of the write clock pulses as will now be described.

The wide screen digitized component signals Y, I and Q are stored in respective ones of memories 40-44. Each memory has a storage capacity of two lines. As one line is being stored in response to the 1100 FH write clock signal FW, a line previously stored is recovered in response to the 910 FH read clock signal FR. Since A/D converters 20, 22 and 26 are clocked by the 1100 FH write clock, the wide screen video signal (Y, I and Q) comprises 1100 picture elements (pixels) per line after conversion to digital form. The pixels are apportioned between the blanking, center and edges for each line as shown in FIG. 3B. Unit 50 causes pixels to be added from each line in the numbers indicated in FIG. 3C by deleting corresponding clock pulses from the write clock. As a result, fewer pixels are stored in the memories than were present in the original signal as shown in FIG. 3D. Accordingly, when the memory is read by the 910 FH read clock (FIG. 3E) the edge regions where write clock pulses are deleted are compressed as a function of the number of pulses deleted without altering the overall horizontal period (63.5 microseconds) of the processed signal.

The specific numbers of pixels deleted shown in FIG. 3C are selected to provide the variable compression factors (25, 50 and 75 percent) within the edge regions shown in FIG. 2. To provide 25% compression, one out of every four clock pulses is deleted. For 50% and 75% compression factors, two out of four and three out of four sequential clock pulses are deleted, respectively.

Pixels are deleted from the blanking interval without compressing the interval. This results because of the specific choice of the number of pixels deleted with respect to the read and write clock frequencies. Specifically, the time interval represented by 190 pixels at the 1100 FH write clock frequency (10.9 microseconds) is the same as that of 156 pixels clocked at the 910 FH read clock frequency. Thus, deleting 34 pixels in the blanking interval results in no change. Deleting more pulses will shorten the inverval. Deleting fewer pulses will lengthen it. If the length of the blanking interval is changed, then a change should be made in the active video interval such that the overall line period remains at the NTSC standard value (about 63.5 microseconds). As an example, if the blanking interval is increased by deleting fewer than 34 write clock pulses, then more pulses should be deleted from the active video interval to compensate for the increased blanking time. The relationship which meets this criteria is that the number of write clock pulses deleted is selected to equal the difference between the number of read and write clock pulses in one line interval. In this example of the invention there are 1100 write clock pulses and 910 read clock pulses, therefore a total of 190 write clock pulses are deleted to prevent changing the line period of the processed output signal.

FIG. 4 is a detailed block diagram of the memory and control elements 40-50 of FIG. 1 and illustrates a further feature of the invention for improving the appearance of the processed signal when it is ultimately displayed in a receiver. Briefly, the pattern of clock pulses which are deleted is varied form line to line. This has been found to be effective in reducing visible artifacts which tend to occur due to decimation of the wide screen signal without use of conventional narrow bandwidth pre-filtering.

Stated another way, edge squeezing by deletion of picture elements may be thought of as a sub-sampling process. The conventional approach to minimize artifacts characteristic of sub-sampled or "decimated" sampled data systems is to limit the bandwidth of the signal prior to sample reduction. This, however, presents substantial problems in an edge-squeeze system because the reduction in samples varies several times throughout each line. Specifically, for 75% compression 3 of 4 samples are deleted. This changes to 2 of 4 and 1 of 4 at compression levels of 50 and 25 percent and to zero out of four for no compression (in the center region). Thus, an optimum pre-decimation filter would have to provide four different bandwidths depending on the compression factor. This in turn complicates delay equalization since filter delay is a function of bandwidth.

As noted above, a solution which has been found to be effective is to not use narrow band pre-decimation filters but rather to alter the pixel deletion pattern periodically. This is implemented in FIG. 4 by storing two pixel deletion patterns in a ROM 402. One pattern is used for even lines, the other for odd lines. Each pattern deletes the same total number of pixels (clock pulses) and so the compression factors are the same. Only the choice of specific pulses to be deleted is varied. FIGS. 5 and 6 are tables listing the contents of ROM 402 showing the two patterns.

In more detail, each of memories 40-44 comprises a pair of 1-H memories (40A, 40B, 42A, 42B etc.). Signals Y, I and Q are applied to the memories and recovered from the memories by six sections (43A-43F) of an eight pole switch. Sections 43G and 43H apply read/write clock signals to the memories. For the switch position shown, signals Y, I and Q are applied to memories 40A, 42A and 44A via sections 43A, 43C and 43E and stored in response to write clock signals developed at AND gate 410 and coupled via switch section 43H. Concurrently, a line of Y, I and Q signals previously stored in memories 40B, 42B and 44B is recovered in response to 910 FH read clock signals provided to terminal 412 and selected by switch section 43G. Sections 43B, 43D and 43F couple the outputs of the memories being read to output teminals. When one line has been recovered, the switch 43 position is changed to place the B memories in the write mode and the A memories in the read mode and the process repeats.

Deletion of the 1100 FH write clock pulses is provided by AND gate 410 controlled by ROM 402 as follows. The 1100 FH clock pulses at terminal 416 are applied to gate 410 and to an 11 bit counter 406. Counter 406 counts the FW pulses to generate address bits Al to A11 for ROM 402. The counter is reset at the start of each line by line rate pulses FH from terminal 418. The highest address bit (A12) is provided by a flip flop 404 clocked by pulses FH. Accordingly, the pattern data bit (D1) stored in ROM 402 is taken from low memory (addresses 0-2047) during one line and from high memory (addresses 2048-4095) during the next line. FIG. 5 lists the entire contents of the low memory pattern and FIG. 6 lists the contents of the high memory pattern. A "one" in the pattern enables AND gate 410 to pass a 1100 FH pulse. A "zero" causes AND gate 410 to delete a pulse. As shown, the total number of deleted pulses is the same (190) in both patterns but the particular pulses deleted changes. As an example, in the 4 to 1 compression region (starting at address 190) in low memory the delete pattern is "1000". This signifies that the first pulse (address 190) is passed and the following three are deleted. This four bit sequence is repeated until address 242 when the pattern changes to 1010 corresponding to a 50% compression factor. In FIG. 6, the corresponding patterns of deletion are "0010" and "0101" respectively. Thus, the deletion pattern changes (alternates) from line to line thereby reducing visible artifacts for the reasons previously discussed.

The wide aspect ratio receiver of FIG. 7 includes an antenna terminal 702 for receiving a wide aspect ratio video input signal which will be assumed to be developed as described in connection with FIGS. 1-6. Alternatively, other means may be used for developing the wide aspect ratio signal such as disclosed in the aforementioned Dischert et al. patent applications. It will be assumed that however developed the edge compression factors are 25, 50 and 75 percent. If other factors are used then appropriate changes should be made to the ROM of control unit 750. It is a feature of the receiver, as will be seen, that essentially the same hardware and software elements that provide edge squeezing in the system of FIG. 1 can provide edge de-squeezing in the receiver.

The wide aspect ratio compatible signal is applied to a tuner, IF amplifier and detector unit 704 of conventional design which provides a baseband composite NTSC video output signal S3 to an analog decoder unit 706 and to a sync detector 708. Unit 706 converts signal S3 to R,G,B component form. Alternatively, conversion may be to Y, I, Q or some other component form (e. B-Y). The RGB signals are then digitized by a tripple A/D converter 710 clocked at a frequency of 910 FH provided by write clock 712. There are thus 910 pixels per line of the digitized signals.

The digitized signals are stored in respective ones of memories 714-718 in response to 910 FH write clock pulses provided by clock 712. All 910 samples of each component are stored. Concurrently, a line previously stored is recovered in response to an 1100 FH read clock 720 in which selected pulses are deleted by means of control unit 750. Deleting read clock pulses has the effect on the memory operation of stretching a stored sample in proportion to the length of time that the read clock is "stopped" or, more correctly, "paused". After "de-squeezing" in memories 714-718, the wide screen RGB video signals are converted back to analog form in tripple D/A converter (i.e., including three D/A converter sections) 722, low pass filtered by filters 724-728 and applied to a 5×3 aspect ratio display (e.g., a wide screen kinescope or projection device) 730 that is synchronized at standard NTSC line and field rates by means of sweep generator 731.

Figure 7:
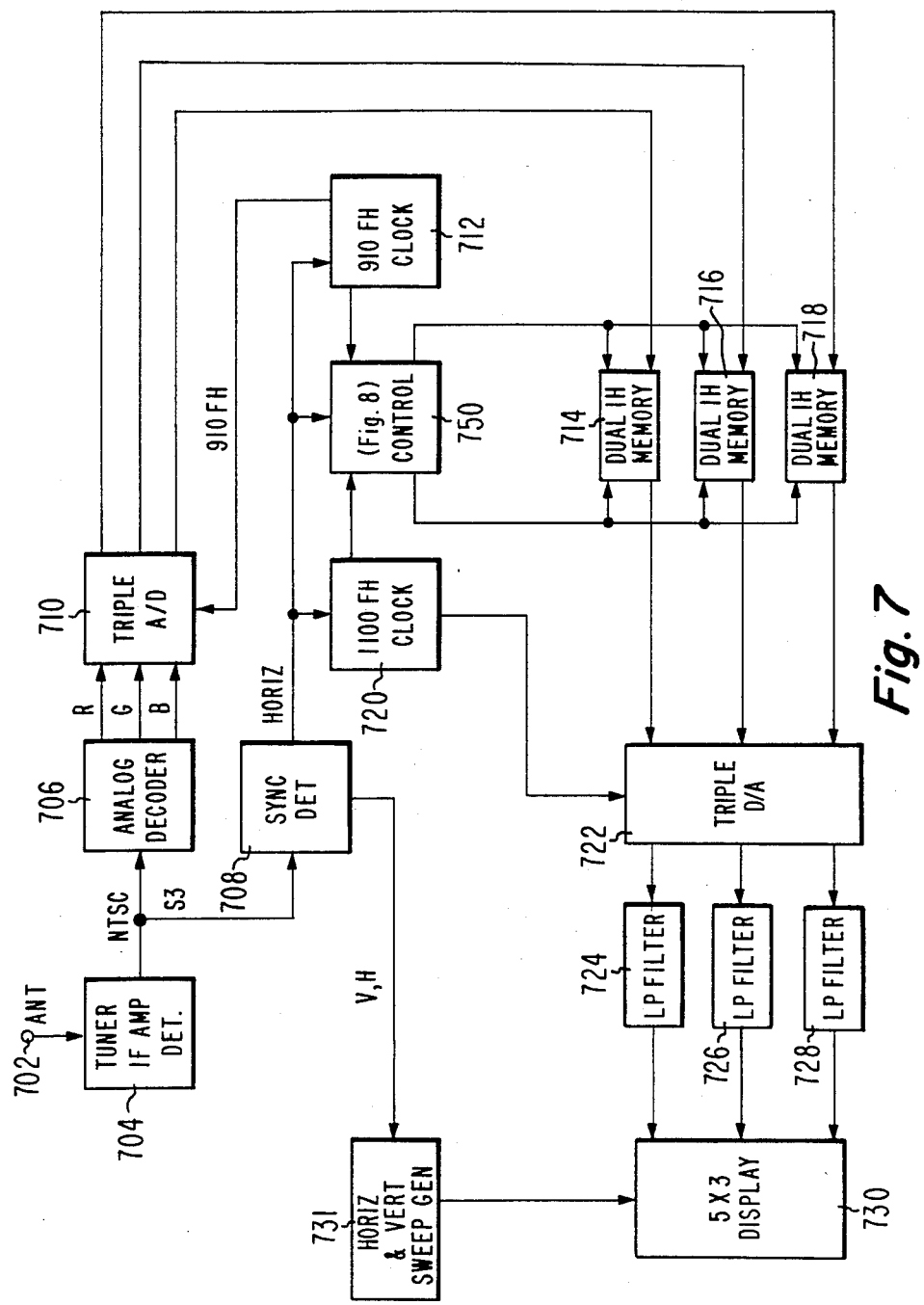
FIG. 7 is a block diagram of a wide screen receiver system embodying the invention.
Figure 8:
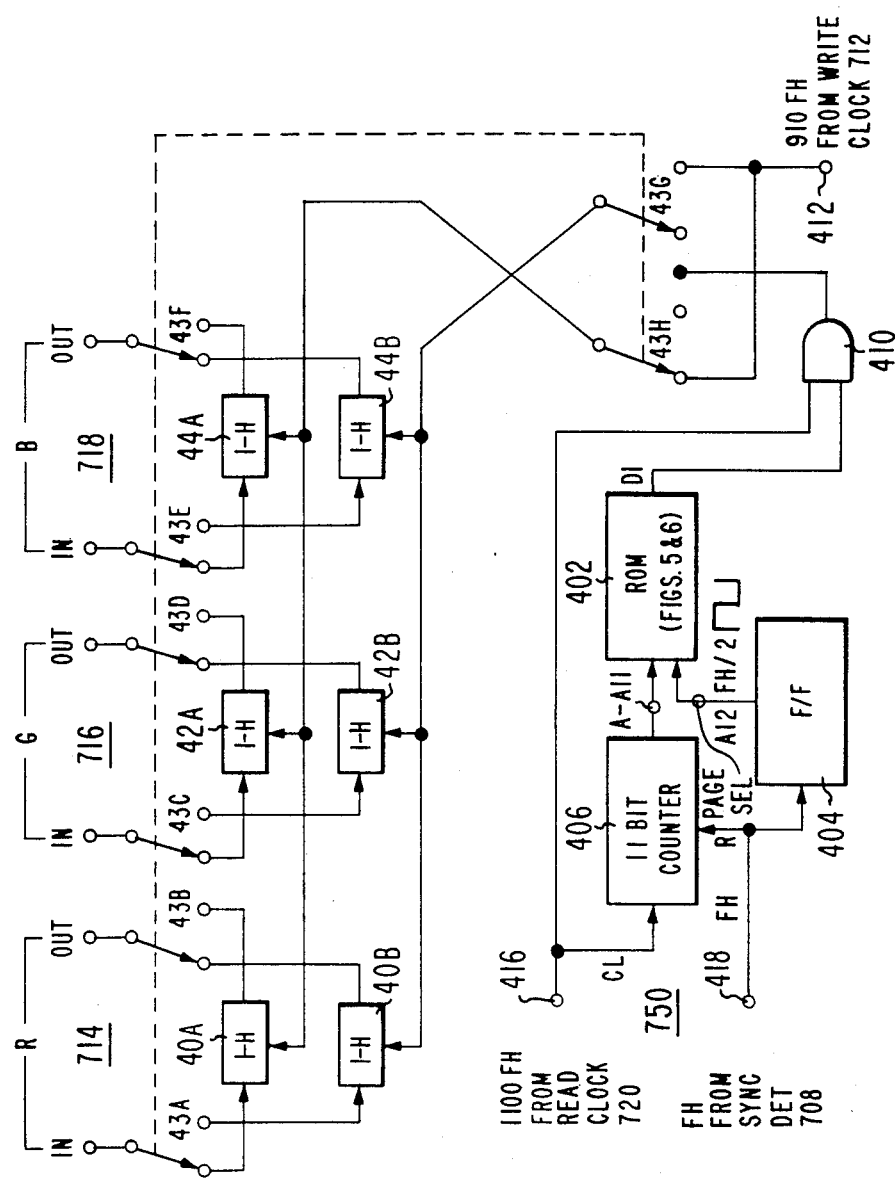
FIG. 8 is a block diagram of an edge expander suitable for use in the receiver of FIG. 7.

Edge expansion (de-squeezing) of the compatible wide screen signal in the receiver of FIG. 7 is analogous to the edge compression technique used in the system of FIG. 1. In fact, as shown in FIG. 8, the identical hardware and software used for compression in FIG. 4 provides expansion in FIG. 8 by simply reversing the read and write clock frequencies and reversing the connections to switch sections 43H and 43G.

In operation, the one line memories function as previously described to store and recover each line of the video input signal (R, G and B in this case). Control unit 750 is directly analogous to unit 50 except that read clock pulses are deleted rather than write clock pulses and the read and write clock frequencies are reversed. The deletion patterns stored in ROM are the same as in the compression system (see FIGS. 5 and 6) and are alternated line-by-line to reduce artifacts as previously described in detail.

FIG. 9 provides a detailed listing of the pixel apportionment in the sync and active video regions and of the deletion of read clock pulses. As shown, the operation is complementary to that of the encoder as illustrated in FIG. 3. FIG. 9A illustrates the timing of the video input signal and is the same as FIG. 3E. FIGS. 9B and 9C illustate the apportionment of the 910 pixels of the wide screen signal stored in memory. FIG. 9D lists the numbers of read clock pulses deleted to expand the edge regions. Deleting read clock pulses, as previously mentioned, has the effect of stretching or repeating the last pixel in proportion to the number of read pulses deleted. FIG. 9E illustrates the final format of the de-squeezed output signal in terms of pixels and timing and, as seen, the signal is restored to its original wide screen format shown in FIGS. 3A and 3B.

Figure 10:
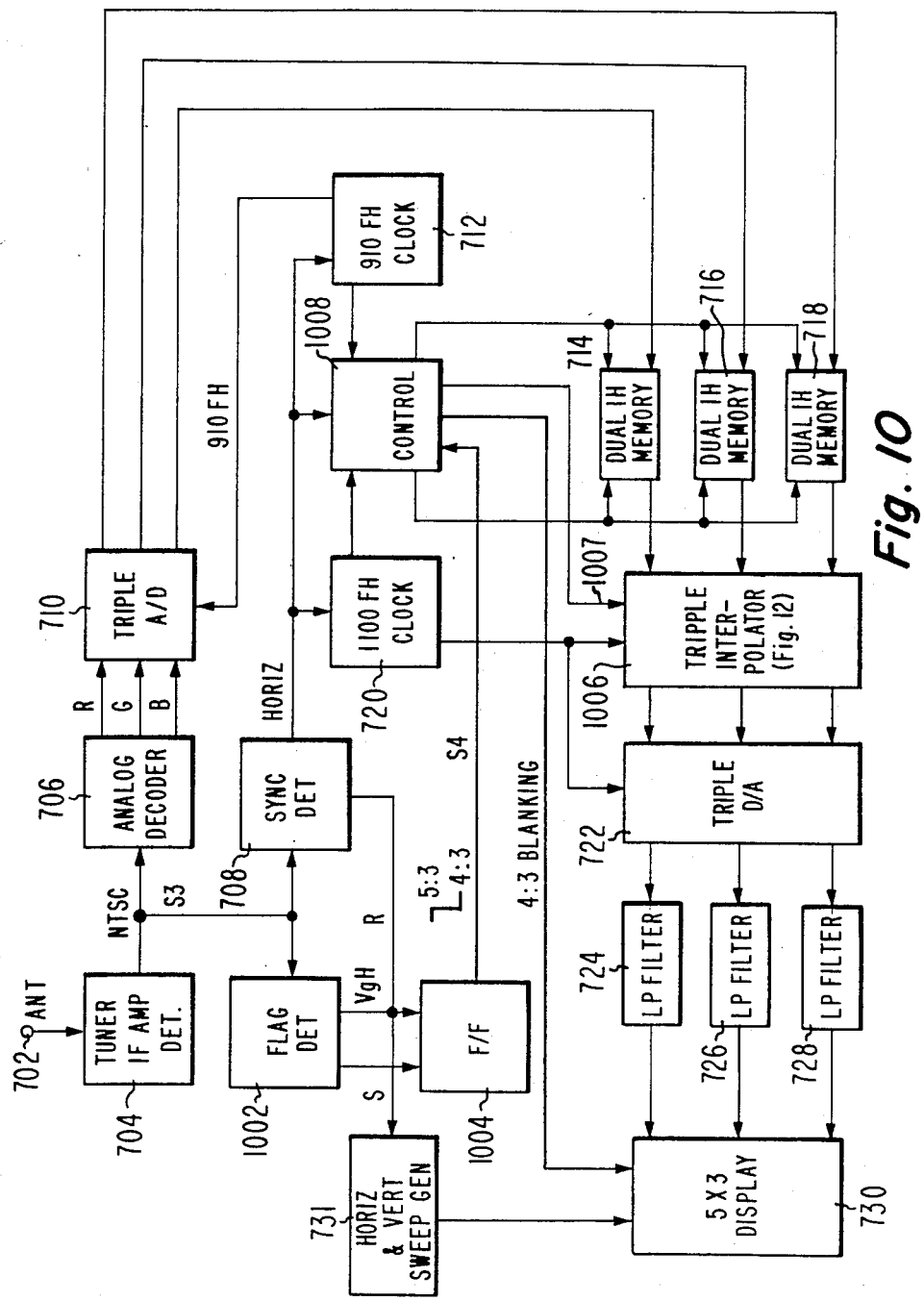
FIG. 10 is a block diagram of a dual mode television receiver embodying the invention.

FIG. 10 illustrates a modification of the receiver of FIG. 7 to provide dual mode operation for displaying standard aspect ratio (4:3) and wide aspect ratio (5:3) images on display unit 730. Importantly, the modified receiver avoids convergence problems which may arise in dual mode receivers of the kind previously discussed which alter the raster width to change the display aspect ratio. A raster which is properly converged for a wide aspect ratio image may require reconverging when the width is reduced.

Figure 11:
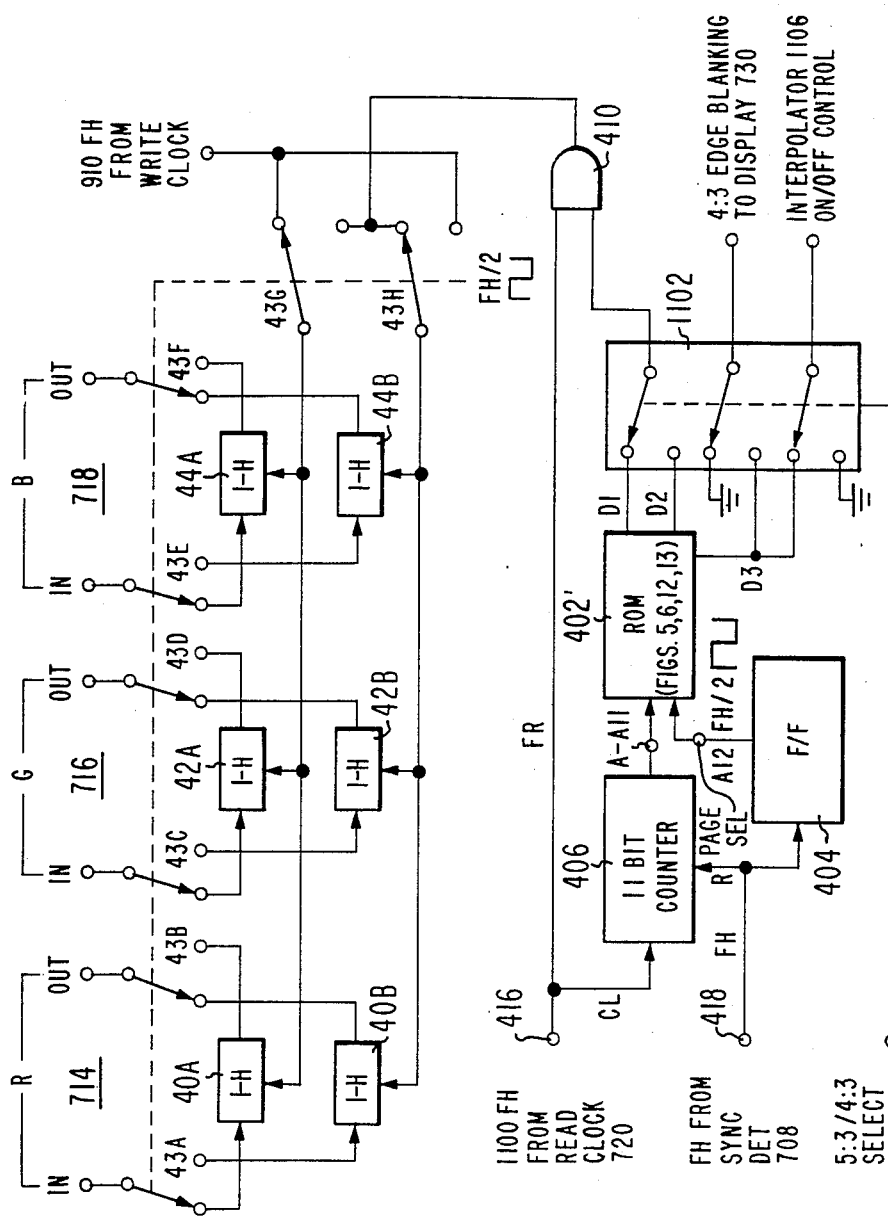
FIG. 11 is a block diagram of an image expander suitable for use in the dual mode receiver of FIG. 10.

This problem is avoided in the receiver of FIG. 11 by operating display unit 730 with a constant horizontal deflection and varying the apparent raster size by blanking the edge regions of the raster when a 4:3 aspect ratio picture is displayed. Advantageously, the same signal which provides the edge blanking in the standard aspect ratio mode also provides control of an interpolator in the wide aspect ratio mode. The interpolator improves the visual quality of the expanded edge regions of the wide aspect ratio picture but must be disabled during the central region (uncompressed) of the picture to avoid loss of resolution.

The modifications to the receiver shown in FIG. 10 comprise the addition of a flag detector 1002, a flip flop 1004 and an interpolator 1006 and replacing control unit 750 with a modified control unit 1008 as shown in FIG. 11. Detector 1002 may be conventional design (e.g., a level detector or some suitable form of digital code or pulse detector) and is coupled to the output of unit 704 for supplying a SET signal to flip flop 1004 when the flag signal is present in the vertical blanking interval. Flip flop 1004 receives a RESET signal from sync detector 708 at the start of each vertical blanking interval. Accordingly, if the flag signal is present, flip flop 1004 is SET for one field. Conversely, if the flag signal is not present flip flop 1004 is RESET for one field interval. The output signal (S4) of flip flop 1004 thus identifies the signal as being wide or standard aspect ratio on a field by field basis. If this automatic detection feature is not desired, flip flop 1004 and detector 1002 may be deleted and replaced by a user operated toggle switch. Alternatively, a manual aspect ratio control switch may be connected to flip flop 1004 for providing both manual and automatic aspect ratio control.

Figure 14:
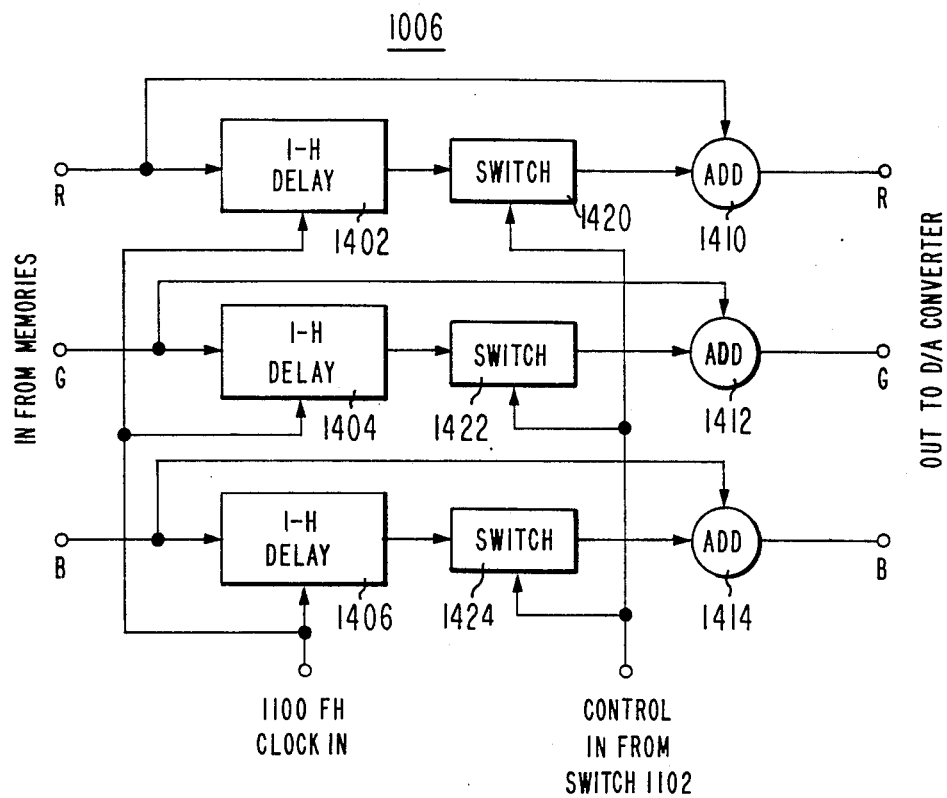
FIG. 14 is a block diagram of a switchable interpolator suitable for use in the dual mode receiver of FIG. 10.

Interpolator 1006 may be of conventional design but should be equipped with a control input for either bypassing or disabling the interpolator in response to a control signal. FIG. 14 gives a suitable example of a switched two-point linear interpolator. The reason that for controlling the interpolator is that the central portion of compatible wide aspect ratio pictures is either uncompressed or so slightly compressed (e.g., 2.5% as in the Powers system) that interpoltion would degrade the resolution of wide aspect ratio images in this region. Interpolation is, in a sense, an averaging process and thus inherently tends to soften a picture. If the interpolator were allowed to operate during the uncompressed portions of the picture, the result would be a needless loss of resolution. Interpolation has been found to be beneficial in the edge regions of maximum compression where 3 of 4 pixels have been deleted. Accordingly, it is desirable to control the interpolator in accordance with the receiver operating mode and as a function of the compression factor in the wide aspect mode.

Specifically, in this example of the invention, the interpolator is turned off by control unit 1008 when standard aspect ratio pictures are displayed. The interpolator is also turned off during the central regions (uncompressed or slightly compressed) of wide aspect ratio images. The interpolator is enabled at least at times of the wide screen signal corresponding to maximum image expansion.

In addition to generating a blanking signal for display 730 and a control signal for interpolator 1006, control unit 1008 also provides a modified clock pulse deletion pattern for memories 714–718. This modified pattern is used when standard aspect ratio pictures are displayed to coordinate picture storage with blanking. FIG. 11 illustrates the modifications to unit 1008; FIG. 12 is a program listing of ROM data for clock pulse deletion for standard aspect ratio pictures and FIG. 13 is a program listing of ROM data for controlling interpolator 1006 and for blanking display 730.

Control unit 1108 of FIG. 11 is identical to that of FIG. 8 except for the inclusion of two additional program listings in ROM 402 shown in FIGS. 12 and 13 and the addition of a switch 1102. The program of FIG. 12 lists the pattern of read clock pulses which are deleted by AND gate 410 when standard aspect ratio pictures are received. Switch 1102 is controlled by the aspect ratio select signal from flip flop 1104. As shown in FIG. 12, all read clock pulses are deleted at addresses corresponding to the edge regions of a wide aspect ratio picture when a standard aspect ratio picture is received. This deletion pattern is not changed from line to line (i.e., the pattern stored in high memory is identical to that stored in low memory). Since all pixels of the standard signal are stored in the memory by the write clock, pausing the read clock during addresses corresponding to the edge regions results in no video output signal being produced during those regions and no loss of 4:3 picture data.

It will be noted from FIG. 12 that the 754 pixels of active video of the 4:3 aspect ratio signal are delayed relative to the end of sync by 78 cycles of the 1100 FH read clock. This specific delay centers the 4:3 image on the 5:3 aspect ratio display. By increasing the delay the 4:3 image will be displayed to the right of center on the 5:3 display. Decreasing the delay has the opposite effect. One may thus control the horizontal position of displayed 4:3 aspect ratio images by different clock pulses deleting patterns for such special effects as shifting the 4:3 image left or right to provide room for a further image or character on the 5:3 display.

In order to ensure that the screen is fully blanked during edge regions, the blanking extends to address 285 and thus slightly overlaps the active video signal which begins at address 268. This is illustrated in FIG. 13, where it is seen that a "1" (blanking enable) is produced from addresses 190 to 285 of the left edge whereas in FIG. 12, the active video begins at address 286. The data D3 of FIG. 13 is applied via switch 1102 to blank display 730 when standard aspect ratio signals are received and is supplied to interpolator 1108 for enabling the interpolator when wide aspect ratio signals are received.

The program listing of FIG. 13 (data D3 of FIG. 11) controls blanking and interpolation as follows. When wide aspect ratio signals are received, switch 1102 is placed in the position shown for applying the edge expansion program data D1 to AND gate 410, for grounding (disabling) the blanking signal supplied to display 703 and for applying the program data D3 of FIG. 13 to enable interpolator 1106. The interpolator is enabled in the edge intervals (addresses 190 and 285 and 1004 to 1099). When standard aspect ratio signals are received, switch 1102 is changed for applying the read clock pause data of FIG. 12 to AND gate 410, for disabling interpolator 1106 and for supplying the program data D3 to display 730 for blanking the display in the edge regions. Alternatively, rather than blanking the display, the data D3 may be used to supply appropriate "fill" video signals to the edge regions (e.g., video signals representing a gray level or some suitable colored border) or to key the insertion of another picture in the edge regions.

Switched interpolator 1006 may be implemented as shown in FIG. 14. As shown, each of the R, G and B signals is delayed by one line in respective delay elements 1402–1406. Delayed and non-delayed R, G and B signals are added by adders 1410–1414 to provide two-point linearly interpolated output signals. On/off control is provided by means of switches 1420–1424 controlled by unit 1008 as previously described.

What is claimed is:

1. A video display system, comprising:
   display means for producing a raster having constant width and an aspect ratio greater than 4:3;
   signal source means for providing a video input signal representative of an image having an aspect ratio equal to 4:3; and
   signal processing means coupled to said signal source means and responsive to said video input signal for supplying a processed video output signal to said display means in which each displayed horizontal line thereof includes a horizontal synchronizing interval, a delay interval and an active video interval for causing said display means to produce an image having an aspect ratio equal to 4:3 and a horizontal position determined by said delay interval;
   first circuit means coupled to said processing means for producing a control signal in a predetermined time interval coincident with at least a portion of said delay interval of said processed video output signal; and
   second circuit means for applying said control signal to said display means for inhibiting the display of image information in response to said video input signal during said predetermined time interval.

2. A system as recited in claim 1 wherein said control signal comprises a blanking signal.

3. A system as recited in claim 2 wherein said control signal is further coincident with a portion of said active video interval for inhibiting display of an edge portion of said processed video output signal.

4. A video display system, comprising:
   display means for producing a raster having constant width and an aspect ratio greater than 4:3;
   signal source means for providing a video input signal representative of an image having an aspect ratio equal to 4:3;
   signal processing means coupled to said signal source means and responsive to said video input signal for supplying a processed video output signal to said display means in which each displayed horizontal line thereof includes a horizontal synchronizing interval, a delay interval and an active video interval for causing said display means to produce an image having an aspect ratio equal to 4:3 and a horizontal position determined by said delay interval; and wherein
said signal processing means includes memory means having information stored therein for controlling said delay interval of said video output signal.

5. A video display system comprising:
display means for producing a raster having a constant width and an aspect ratio greater than 4:3;
signal source means for providing a video input signal representative of an image having an aspect ratio which varies between a standard value of 4:3 and a wide screen value greater than 4:3;
dual mode signal processing means coupled to said signal source means and responsive to said video input signal in a first operation mode for supplying a first processed video output signal to said display means representative of a wide screen image and having a second operating mode for supplying a second processed video output signal to said display means representative of said standard aspect ratio image, and wherein each displayed horizontal line of said second processed video output signal includes a synchronizing interval, a delay interval and an active video interval for causing said display means to produce an image in said second operating mode having an aspect ratio for 4:3 and a horizontal position determined by said delay interval;
first circuit means coupled to said processing means for providing a control signal conincident with at least a portion of said delay interval of said second processed video output signal; and
second circuit means for applying said control signal to said display means as a blanking signal when said processing means is in said second operating mode.

6. A video display system as recited in claim 5 wherein:
said video input signal is of compressed form when representative of said wide screen image;
said processing means includes means for de-compressing said video input signal in said first operating mode; and further comprising:
interpolator means in said processing means for interpolating at least a portion of each displayed line of said first processed video output signal.

7. A video display system comprising:
display means for producing a raster having a constant width and an aspect ratio greater than 4:3;
signal souce means for providing a video input signal representative of an image having an aspect ratio which varies between a standard value of 4:3 and a wide screen value greater than 4:3;
dual mode signal processing means coupled to said signal source means and responsive to said video input signal in a first operation mode for supplying a first processed video output signal to said display means representative of a wide screen image and having a second operating mode for supplying a second processed video output signal to said display means representative of said standard aspect ratio image, and wherein each displayed horizontal line of said second processed video output signal includes a synchronizing interval, a delay interval and an active video interval for causing said display means to produce an image in said second operating mode having an aspect ratio of 4:3 and a horizontal position determined by said delay interval; and
circuit means in said processing means responsive in said first operation mode for applying interpolation to said first processed video output signal and responsive in said second operating mode for supplying a blanking signal to said display means.

8. A video display system comprising:
display means for producing a raster having a constant width and an aspect ratio greater than 4:3;
signal source means for providing a video input signal representative of an image having an aspect ratio which varies between a standard value of 4:3 and a wide screen value greater than 4:3;
dual mode signal processing means coupled to said signal source means and responsive to said video input signal in a first operation mode for supplying a first processed video output signal to said display means representative of a wide screen image and having a second operating mode for supplying a second procesed video output signal to said display means representative of said standard aspect ratio image, and wherein each displayed horizontal line of said second processed video output signal includes a synchronizing interval, a delay interval and an active video interval for causing said display means to produce an image in said second operating mode having an aspect ratio of 4:3 and a horizontal position determined by said delay interval; and wherein:
said processing means includes memory means having first and second bit patterns stored therein and means for selecting said first bit pattern in said first operating mode for processing said first video output signal and for selecting said second bit pattern in said second operating mode for processing said second video output signal, said second bit pattern controlling said delay interval of said second processed video output signal.

* * * * *